United States Patent [19]

Razzacki

[11] Patent Number: 5,036,719
[45] Date of Patent: Aug. 6, 1991

[54] STRUTLESS SYNCHRONIZER WITH COMPOSITE BLOCKING RING

[76] Inventor: Syed T. Razzacki, 2393 Claymont, Troy, Mich. 48098

[21] Appl. No.: 455,679

[22] Filed: Dec. 22, 1989

[51] Int. Cl.$^5$ .............................................. F16H 3/38
[52] U.S. Cl. ..................................... 74/339; 192/53 F
[58] Field of Search ......................... 74/339; 192/53 F

[56] References Cited

U.S. PATENT DOCUMENTS

| | | | |
|---|---|---|---|
| 2,470,208 | 5/1949 | Avila | 192/53 F |
| 3,700,083 | 10/1972 | Ashikawa et al. | 192/53 F |
| 4,660,707 | 4/1987 | Sadanori et al. | 192/53 F |
| 4,776,228 | 10/1988 | Razzacki et al. | 74/339 |
| 4,852,709 | 8/1989 | Fukuhara et al. | 192/53 F |

FOREIGN PATENT DOCUMENTS

| | | | |
|---|---|---|---|
| 2408762 | 7/1979 | France | 192/53 F |
| 4527483 | 3/1967 | Japan | 192/53 F |
| 0020931 | 2/1980 | Japan | 192/53 F |
| 1000494 | 1/1964 | United Kingdom | 192/53 F |

*Primary Examiner*—Allan D. Herrmann
*Assistant Examiner*—Ryan W. Massey
*Attorney, Agent, or Firm*—Edward P. Barthel

[57] ABSTRACT

An improved strutless synchronizer wherein a composite blocker ring is composed of fiber reinforced thermosetting resin. The blocker ring is uniquely designed with three radially extending external detent bumps equally spaced about the ring. The detent bumps provide interference to the passage of three sets of corresponding internal cam-like tall teeth formed on the synchronizer sleeve as the sleeve is moved axially to engage clutching teeth of a ratio gear. Initially the tall teeth contact their associated detent bumps loading the ring internal clutch cone surface on the ratio gear external clutch cone surface. As the sleeve continues to move, the tall teeth ride over the detent bumps and resiliently compress the blocker ring thereby generating the required breakthrough load of the synchronizer enabling the sleeve to pass the blocker ring and lockingly engage the ratio gear clutch teeth.

1 Claim, 4 Drawing Sheets

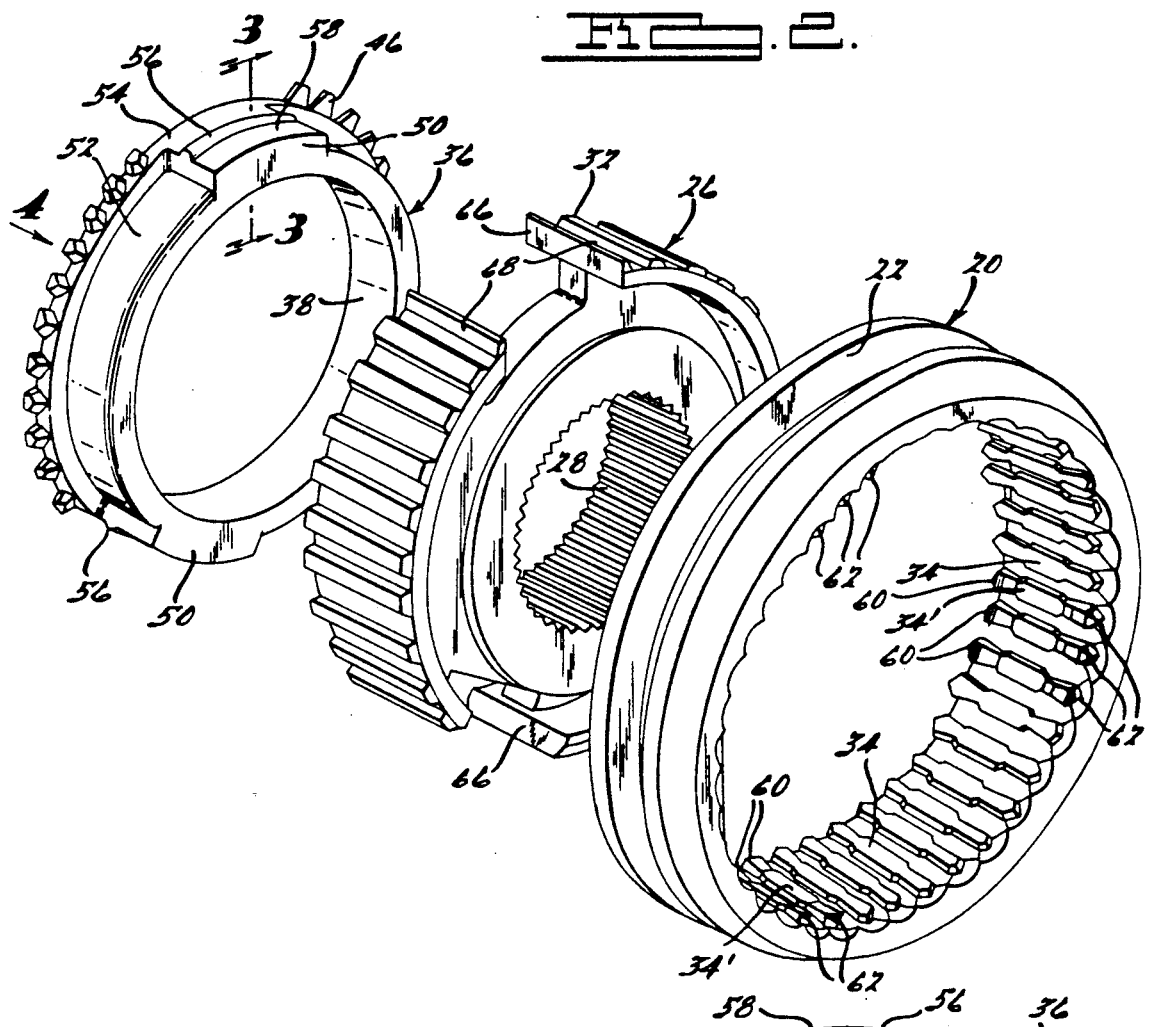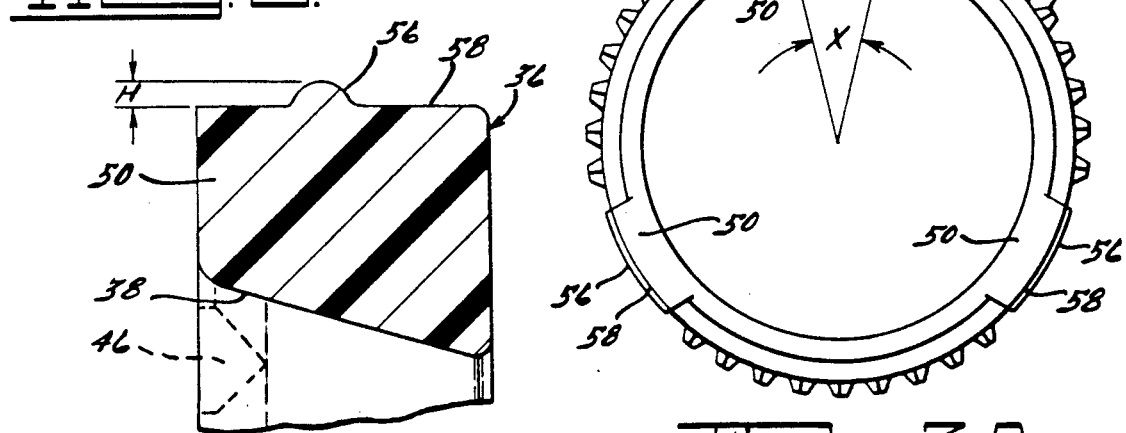

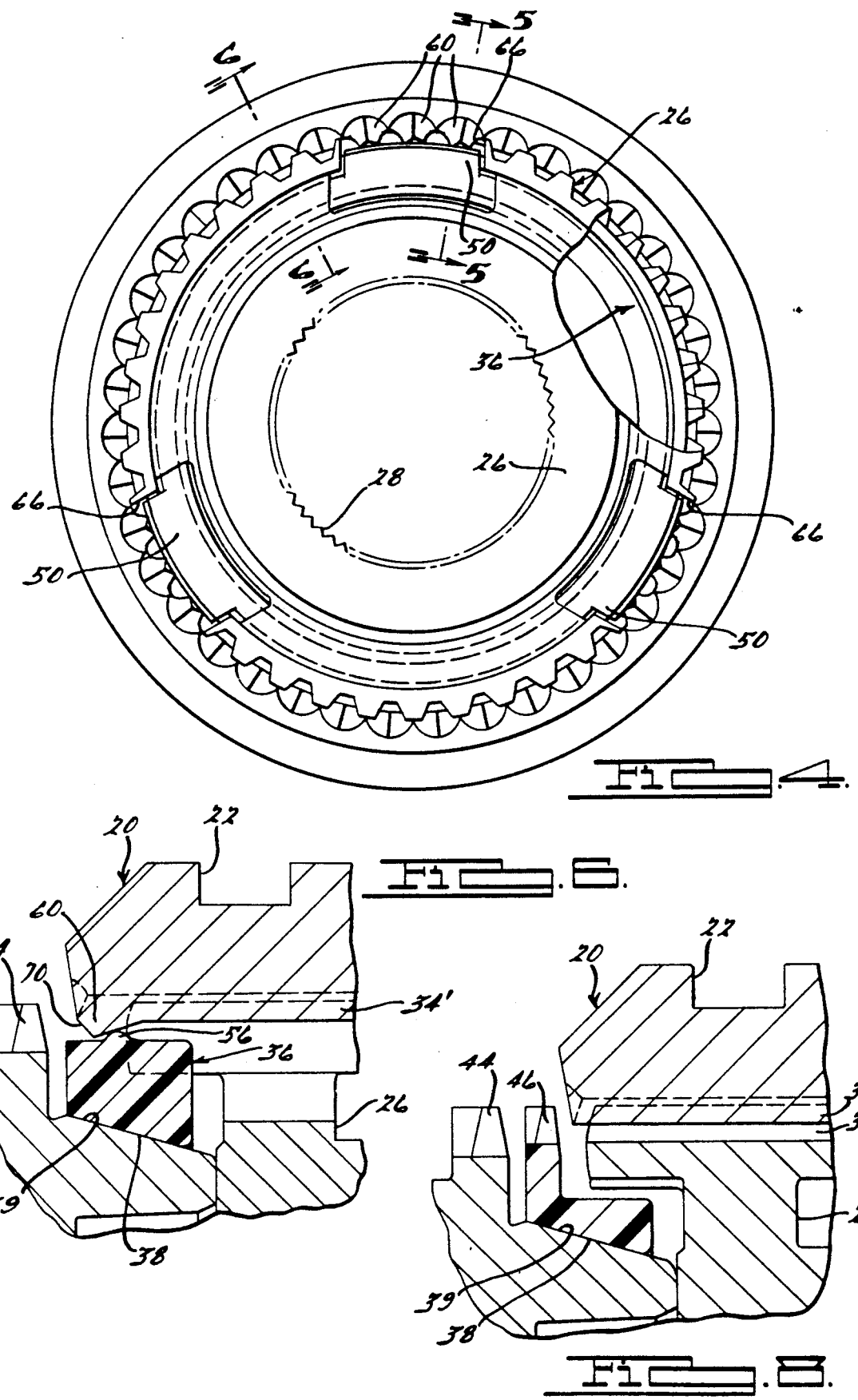

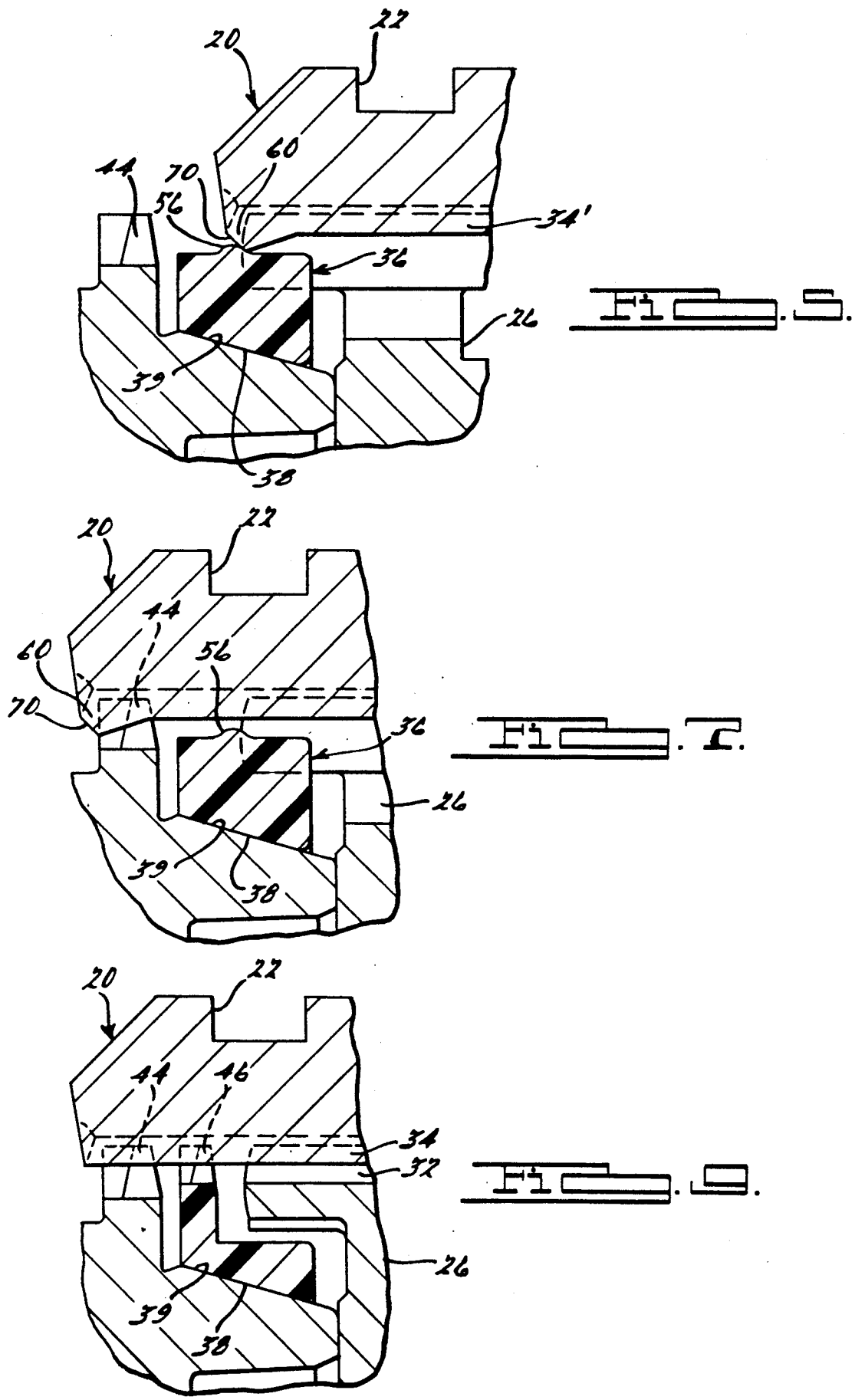

STRUTLESS SYNCHRONIZER WITH COMPOSITE BLOCKING RING

BACKGROUND OF THE INVENTION

This invention relates to strutless synchronizers for manual transmissions and more particularly to a strutless/springless synchronizer that utilizes the inherent resilient properties of a composite blocking ring composed of fiber reinforced thermosetting resin formed with integral raised detent bumps.

The U.S. Pat. No. 4,776,228 issued Oct. 11, 1988 to Razzacki et al., and entitled Strutless Synchronizer discloses an improved synchronizer having an annular wire spring interposed between an internally splined sleeve, mounted for axial sliding movement on a transmission main shaft an associated metal blocking ring. Selected ones of the sleeve splines are formed at their extremities with radially inwardly extending "tall" cam-like teeth. Each tall tooth has a dual chamfered face portion arranged in opposed relation to the annular wire spring. The blocking ring has three equally spaced lugs each formed with a transverse groove sized to axially capture the wire spring so as to allow the spring freedom to rotate in its grooves relative to the blocking ring. Each time the sleeve is shifted toward meshed engagement with an associated main shaft ratio gear its detent teeth chamfered faces compress the wire spring at random points thereby minimizing spring wear while the grooves positively retain the spring also insuring instant unloading of the blocking ring.

SUMMARY OF THE INVENTION

It is a principal object of the invention to provide strutless synchronizer having a blocking ring molded from composite fiber-reinforced resin material and formed with three uniformly spaced integral raised detent bumps each having a rounded profile in axial cross section. The synchronizer has an internally splined sleeve, similar to the sleeve in the above mentioned '228 patent, wherein selected ones of the sleeve splines are formed at their extremities with radially inwardly projecting cam-like tall teeth formed with chamfered face portions. Each blocking ring detent bump has a predetermined radial height and is positioned in opposed relation to a set of two or more associated sleeve tall teeth for engagement thereby. Each time the sleeve is moved toward meshed engagement with clutch teeth on an associated main shaft ratio gear its internal set of tall teeth are moved axially from their neutral position contacting their associated blocking ring detent bump. This initial contact axially sets the blocker ring internal cone surface on the gear exterior cone surface and starts the generation of the break through load. As the sleeve continues to move the tall teeth to ride over the detent bumps, with the break through load peaking at the crest of the bumps, resiliently compressing the blocker ring and energizing the cone clutch. Further travel of the sleeve causes the tall teeth to ride over the blocking ring detent bumps and the cone torque falls to zero. Chamfer-to-chamfer loading of the sleeve and blocking ring teeth results in the index torque that is overcome by the cone torque and the blocker ring indexes to allow the sleeve splines to pass the blocker ring teeth and engage the ratio gear clutch teeth completing the synchronizer lockup.

BRIEF DESCRIPTION OF THE DRAWINGS

Further features and advantages of the invention will become apparent to those skilled in the art upon reference to the following description and accompanying drawings in which:

FIG. 2 is an enlarged exploded perspective view of sleeve, hub and blocker ring elements of the synchronizer mechanism shown in FIG. 1;

FIG. 3 is an enlarged fragmentary longitudinal cross sectional view taken on the line 3—3 of the blocker ring shown in FIG. 2;

FIG. 3A is detail inner end elevational view of the blocker ring of FIG. 2;

FIG. 4 is an enlarged end elevational view, with parts broken away, taken in the axial direction indicated by arrow "4" of FIG. 2 with the sleeve, hub and blocker ring shown in their assembled positions;

FIG. 5 is an enlarged fragmentary cross sectional view taken on the line 5—5 of FIG. 4 with the sleeve tall teeth just contacting the blocker ring detent bump;

FIG. 6 is an enlarged fragmentary cross sectional view similar to FIG. 5 with the sleeve tall teeth moved past the detent bump;

FIG. 7 is an enlarged fragmentary cross sectional view similar to FIG. 5 with the sleeve internal teeth shown in locked engagement with the ratio gear clutch teeth;

FIG. 8 is an enlarged fragmentary cross sectional view taken on the line 6—6 of FIG. 4 with the sleeve moved to its FIG. 5 position; and FIG. 9 is an enlarged fragmentary cross sectional view taken on the line 6—6 of FIG. 4 with the sleeve moved to its FIG. 7 position.

DETAILED DESCRIPTION OF THE INVENTION

Figure 1:
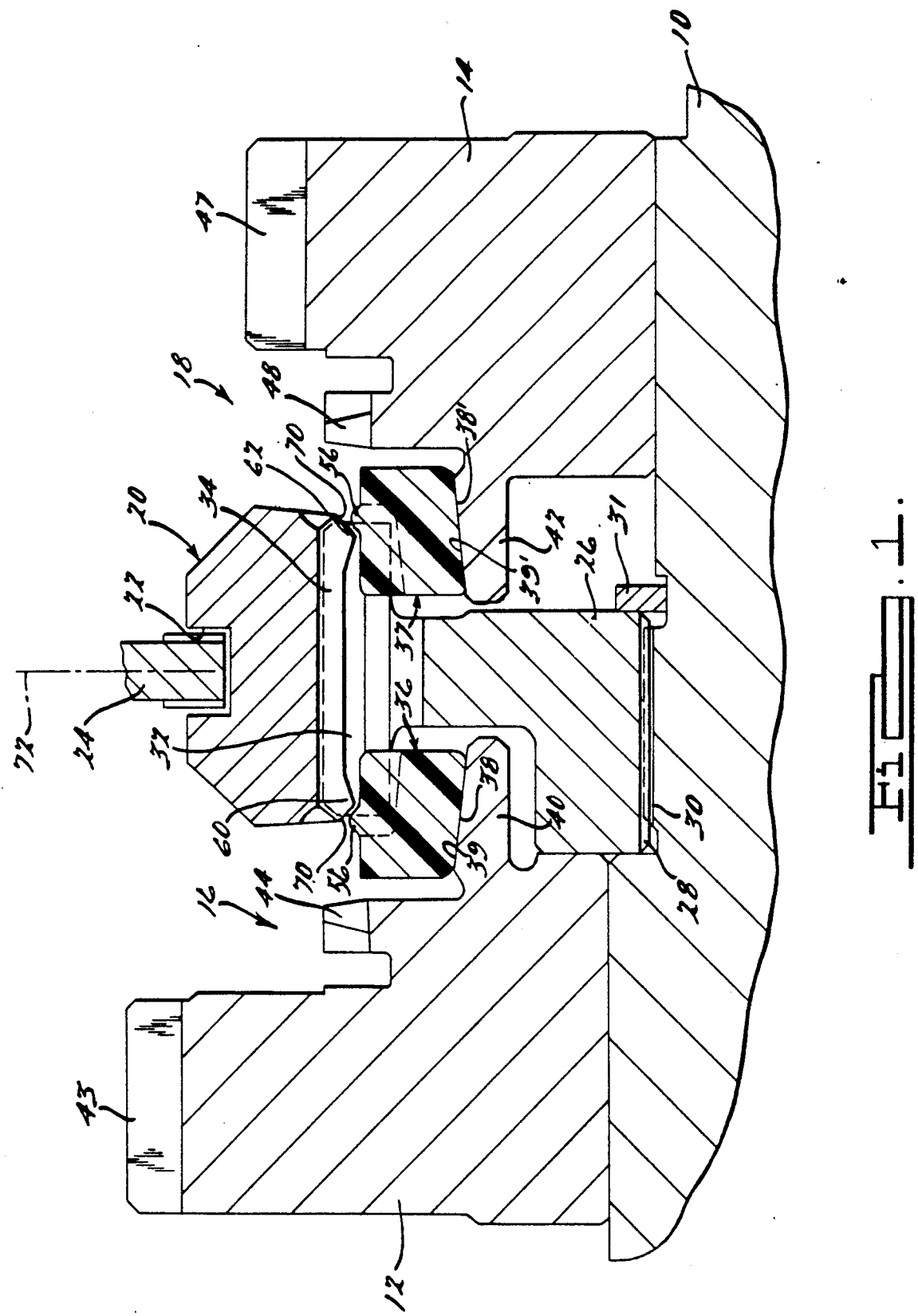
FIG. 1 is an axial longitudinal cross section view of the synchronizing mechanism in its neutral position according to the present invention.

Referring now to the drawings there is seen in FIG. 1 a transmission shaft 10, on which are rotatably supported a pair of left and right speed ratio gears 12 and 14. Disposed between the ratio gears 12 and 14 is a synchronizer assembly comprising left and right synchronizers 16 and 18 respectively, which are operable to cause selective speed synchronization between shaft 10 and their associated ratio gears 12 and 14.

The synchronizer assemblies 16 and 18 are operated through a shift sleeve 20 which is connected by a yoke groove 22 to a conventional mechanical shift fork mechanism partially shown at 24. FIG. 2 of the drawings shows the left synchronizer assembly 16 in an exploded perspective view. As the right synchronizer assembly 18 is substantially identical to the synchronizer assembly 16, like or similar parts will operate in a similar manner except for the axial direction of travel.

The synchronizer assemblies include a common hub 26 fixedly connected to the main shaft 10 through internal splines 28 engaging external splines 30 on the main shaft as seen in FIG. 1. A snap ring 31 axially positions the hub 26 on the shaft 10. The sleeve 20 is mounted on the hub 26 by means of hub external splines 32 slidably engaging sleeve internal splines 34. Thus, the sleeve 20 is axially slidable on the hub 26 by means of the shift fork mechanism 24. It will be noted that the left and right speed ratio gears 12 and 14 are journally supported on the main shaft 10 for rotation relative thereto.

The synchronizer assemblies 16, 18 each includes a respective blocker ring 36 and 37 formed as a composite article composed of fiber reinforced thermosetting resin. The blocker rings have a configuration generally similar to the blocker rings of a strutless synchronizer such as disclosed in the above mentioned 4,776,228 Pat. Thus, the blocker rings 36 and 37 are identical in structure having internal cone clutch surfaces 38 and 38' which slide on associated exterior conical clutch surfaces 39 and 39' formed on left and right ratio gear cone portions 40 and 42, respectively. The ratio gear 12 has a toothed outer diameter or surface 43 adapted to mesh with other gear members in a well known manner.

An exterior clutch toothed surface defined by clutch teeth 44 on the ratio gear 12 is coaxial and alignable with a splined exterior toothed surface defined by teeth 46 formed on the outer circumference of synchronizer blocking ring 36. Both external toothed surfaces 44 and 46 are engageable by the internal splined surface 34 of the shift sleeve 20. It will be appreciated that the sleeve internal splined surface 34 remains in continual engagement with the hub exterior splined surface 32 during axial travel of the sleeve 20.

As best seen in FIG. 2 the blocker ring 36 is formed with a radially extending set of three integral lugs 50 equally spaced on 120 degree centers or intervals around annular surface 52 of the blocking ring. It will be noted that each lug 50 is axially aligned in a symmetrical manner with an associated toothless gap 54 of predetermined arcuate extent in the blocker ring tooth surface 46. The composite blocker rings 36 and 37, in a unique manner, provide their own spring or resilient break-through load. In this manner the invention eliminates the requirement for separate annular wire springs employed in conventional strutless synchronizers as disclosed in the above mentioned Pat. No. 4,776,228.

With reference to FIGS. 2 and 3, it will be seen that a transversely extending raised rib-like detent bump 56 is integrally formed on the arcuate surface 58 of each lug 50. The three detent bumps 56 each define an arcuate segment concentrically disposed about the principal axis of the transmission shaft 10. Further each detent bump 56 has a predetermined height "H" above the arcuate surface 58. Each of the three detent bumps 56 are adapted for developing break through loading by engagement with aligned sets of radially inwardly projecting cam-like tall teeth 60 and 62 formed at each respective left and right hand end of associated sleeve internal splines 34. In the disclosed embodiment three 120 degree spaced left and right sets of tall teeth 60 and 62 are formed at their respective axial ends of associated internal spline teeth 34'.

Hub 26 is shown in FIG. 2 having its external splines 32 interrupted at three uniformly spaced locations by notches 66 axially centered to receive associated blocking ring lugs 50 therein. FIG. 4 of the drawings shows a right lug 50 nested within its associated notch 66 defined by opposed parallel chordal surfaces. It will be seen in FIG. 2 that each of the notches 66 are defined by an associated pair of partial splines 68.

With reference to FIG. 1 the sleeve 20 is shown in its neutral position with left and right beveled ramp portions 70 axially spaced inwardly a predetermined proximity distance from their associated left and right blocker ring detent bumps 56. In the dual acting synchronizer's neutral mode, shown in FIG. 1, the sleeve transverse plane of symmetry, defined by construction line 72, is equidistant from the composite blocker rings 36 and 37 whereby the sleeve is retained in a spaced manner between the rib-like detent bumps 56.

In operation, upon the sleeve 20 being shifted to the left by the shift fork 24 from its neutral position of FIG. 1, the left tall teeth ramp portions 70 are moved through their proximity distance and contact their associated detent bumps 56 as seen in FIG. 5. Such initial detent bump contact moves the left blocker ring 36 axially to the left and sets its internal clutch cone surface 38 and the external cone clutch surface 39 of the ratio gear 12. This cone clutch frictional contact starts the generation of the cone torque and synchronizer break-through load (BTL). As the sleeve is moved further to the left the tall teeth ramp portions 70 "climb-up" the detent bumps 56 compressing the composite blocking ring 36 building up the break through load. The cone clutch is energized and the blocker ring moves to its indexed position when the ramp portion 70 reaches the position just past the detent bump 56 shown in FIG. 6.

With the blocker ring in its indexed position the sleeve moves to a chamfer-to-chamfer loading position with the sleeve tooth chamfers contacting the blocker ring tooth chamfers generating the index torque which is overcome by the cone torque, allowing the sleeve to pass through when the cone torque falls off to zero. The sleeve 20 continues on and the sleeve internal splines 34 lock into engagement with the external clutch teeth 44 as seen in FIGS. 7 and 9 wherein synchronization is now complete.

It will be noted in FIG. 3 that in the preferred embodiment each detent bump 56 is in the form of an elongated arcuate rib having a predetermined radial height above the cylindrical surface 58 denoted by the letter "H". Further, as seen in FIG. 3A, each detent bump 56 is in the form of an elongated arcuate rib subtending a predetermined arc defined by radial angle "X". In the preferred embodiment the radial angle "X" is of the order of 20 degrees of the arc of a circle, such that the three detent bumps 56 subtend a combined arc of about 60 degrees of the 360 degree circle.

The coefficient of friction of the composite blocking ring internal cone clutch surface 38 may, in certain instances, be sufficient. It will be appreciated, however, that the coefficient of friction could be altered by means of a conforming metal lining bonded to the composite internal cone surface 38. Further the metal lining could be of steel material and formed with threads and/or oil slots or a suitable abrasive quartz coating. Still another arrangement to increase the coefficient of fraction would be to provide the cone surface 38 with a friction pad or lining bonded or cemented thereto. An example of one type of friction lining that may be used with the present invention is disclosed in the U.S. Pat. No. 4,267,912 issued May 29, 1981 to Bauer et al., the disclosure of which is incorporated by reference herein.

Although only one embodiment of the invention has been illustrated and described, it is apparent that modifications and variations will readily come to mind of a person skilled in the art which modifications and variations do not fall outside the scope of the invention as defined by the following claims.

What is claimed is:

1. In a gear synchronizer assembly for a synchromesh transmission, said assembly comprising at least one ratio gear journally mounted on a shaft of the transmission and concentric with the principal axis of said shaft, an externally splined hub fixed on said shaft and a sleeve having internal splines coupled to said hub external splines and slidable thereon by engagement means from a neutral position to an outboard operative position for engaging clutch teeth on the ratio gear to couple the ratio gear in rotation with said shaft, a blocker ring having outboard and inboard directed faces and an internal conical clutch surface disposed for controlled sliding abutment with an external conical clutch surface on said ratio gear, said blocker ring having an outer cylindrical surface formed with a radially extending splined tooth surface at said outboard face, resilient compression biasing means for setting said blocking ring internal conical surface against said ratio gear conical clutch surface and couple the same in rotation when said sleeve is initially displaced outboard toward said operative position, said resilient compression biasing means being deformed as said sleeve advances further to said operative position to permit said sleeve to advance therepast and engage the now rotating ratio gear clutch teeth, at least three equally spaced sets of sleeve internal splines, each said set comprising two or more adjacent internal splines each having a tall tooth at least one end thereof, each said tall tooth having a longitudinally extending chamfered end surface ramp, each said tall tooth end surface ramp facing said blocker ring and positioned to contact and inwardly deform said compression biasing means and pass thereover as said sleeve is advanced in an outboard direction to engage said ratio gear clutch teeth, the improvement in said gear synchronizer assembly comprising:

said blocker ring in the form of a composite article molded from synthetic resilient fiber-reinforced resin material integrally formed with at least three uniformly spaced, axially extending, raised lugs on its outer cylindrical surface at said inboard face;

said lugs oriented such that each said lug longitudinally extending radial plane of symmetry coincides with the radial plane of symmetry its associated set of two or more tall teeth;

each said raised lug having longitudinally extending substantially parallel side walls and a longitudinally extending outer cylindrical surface concentric with said blocker ring outer cylindrical surface, each said raised lug adapted for axial nested reception in an associated, complementary shaped notch formed in the periphery of said hub;

each said lug integrally formed with an elongated transversely extending raised rib-like detent bump, each said detent bump in the form of an elongated arcuate rib having a radiused outer crest in longitudinal section, each said arcuate rib outer crest having a predetermined radial height above its associated lug cylindrical surface, each said elongated arcuate rib subtending a predetermined arc of a circle having a radial angle of the order of 20 degrees;

whereby each time said sleeve is advanced in said outboard direction from said neutral position each said set of tall teeth angled end ramps contacting their associated detent bump thereby axially moving said blocker ring internal clutch cone surface into frictional engagement with said ratio gear external clutch cone surface, and whereby continued axial movement of said blocker ring in said outboard direction causing each said set of tall teeth to ride-over their associated arcuate rib outer crest thereby resiliently compressing said blocker ring so as to generate a predetermined cone torque between said cone clutch surfaces enabling said sleeve internal spline teeth to slidably pass said blocker ring external teeth and drivingly engage said ratio gear external clutch teeth for completion of the lockup of said synchronizer.

* * * * *

UNITED STATES PATENT AND TRADEMARK OFFICE
CERTIFICATE OF CORRECTION

PATENT NO. : 5,036,719

DATED : August 6, 1991

INVENTOR(S) : Syed T. Razzacki

It is certified that error appears in the above-identified patent and that said Letters Patent is hereby corrected as shown below:

On the title page, please insert the following:

--[76] Assignee: Chrysler Motors Corporation, Highland Par, Michigan--.

Signed and Sealed this

Nineteenth Day of January, 1993

Attest:

DOUGLAS B. COMER

*Attesting Officer*  Acting Commissioner of Patents and Trademarks